United States Patent

[11] 3,624,652

[72] Inventor Andrew V. Haeff
Washington, D.C.

[21] Appl. No. 641,549
[22] Filed Jan. 16, 1946
[45] Patented Nov. 30, 1971
[73] Assignee The United States Government as represented by the Secretary of the Navy

[54] PULSE GENERATION SYSTEM
10 Claims, 3 Drawing Figs.

[52] U.S. Cl. .......... 343/18 E, 343/180
[51] Int. Cl. .......... H04k 3/00
[50] Field of Search .......... 250/1.76, 20.5, 20.52 GT, 20.54; 343/6.5, 11, 13, 18, 180, 18 E

[56] References Cited

UNITED STATES PATENTS

| | | | |
|---|---|---|---|
| 2,440,253 | 4/1948 | Dodington | 343/18 |
| 2,310,692 | 2/1943 | Hansell | 250/20.54 |
| 2,453,970 | 11/1948 | Charrier | 343/6.5 UX |
| 2,471,418 | 5/1949 | Earp | 250/20.52 |
| 2,134,716 | 11/1938 | Gunn | 250/1.50 |
| 2,398,490 | 4/1946 | Atwood | 250/20.5 |
| 2,410,233 | 10/1946 | Percival | 250/20.5 |

*Primary Examiner*—T. H. Tubbesing
*Attorneys*—J. A. O'Connell and R. G. Reed

CLAIM: 1. A method of impairing the effectiveness of radio echo location operations in which radio frequency impulses are transmitted to an obstacle and the reflections thereof received at the echo location station, which comprises the steps of initiating the transmission of an interfering signal before the receipt of each said radio frequency impulse, maintaining transmission of the interfering signal during receipt of that impulse, and terminating the transmission of the interfering signal after receipt of that impulse but before the receipt of a succeeding radio frequency impulse.

INVENTOR.
ANDREW V. HAEFF
BY M. O. Hayes
ATTORNEY

INVENTOR.
ANDREW V. HAEFF

BY

ATTORNEY

INVENTOR.
ANDREW V. HAEFF
BY M. O. Hayes
ATTORNEY

PULSE GENERATION SYSTEM

This invention relates to devices used to render enemy radio echo location equipment ineffective.

One of the important special applications of radio echo location equipment is its use for the control of gun fire. In such applications the equipment is designed to determine the range and bearing of target objects with greater accuracy than is normally possible with radio echo location equipment intended for detection purposes only.

Efforts to render enemy radio echo location equipment ineffective commonly consist of transmitting a suitably modulated interfering signal which either saturates one or more stages of the radio echo location receiver or renders the visual presentation unintelligible. For the latter purpose modulation with a form of random signal containing a broad spectrum of frequencies up to several megacycles, known as noise modulation, has been found most effective.

The interfering signal must be tuned to or approximately to the carrier frequency of the enemy radio echo location equipment. To be effective, the interfering signal must be many decibels larger than the echo signal at the enemy echo location receiver. The interfering transmitter should be capable of being modulated with a signal containing relatively high frequencies. These three requisites create the need for an interfering transmitter, tunable over a broad range, capable of modulation up to several megacycles, and capable of delivering a large amount of power spread over a broad frequency spectrum. If the interfering signal is to be continuous, the design of such a transmitter involves the use of special vacuum tubes which are not readily available.

An alternative method is to transmit the interfering signal in suitably timed pulses. Such a method permits substantial peak power output from vacuum tubes with low-average power capacities. Its use is based on the premise that for the protection of individual targets from enemy fire control radio echo location equipments, it is sufficient to generate interfering signals which are received by these equipments only over a period which includes the reception of the echo signal.

A further advantage of this alternative method is that equipment designed to transmit pulsed interfering signals can be used with suitable auxiliary circuits to simulate deceptive echo signals.

Such a method requires the use of a receiver both to monitor the enemy signals and to provide a means for controlling the timing of the interfering pulses.

An object of this invention is to impair the effectiveness of enemy radio echo location equipment by covering echo signals with suitably timed interfering pulses.

Another object of this invention is to provide a means of impairing the effectiveness of enemy radio echo location equipment which permits the use of vacuum tubes having low-average power ratings.

A further object of this invention is to provide a means for neutralizing interfering signals in the monitor or control receiver used with an interfering transmitter.

Other objects and features of the present invention will become apparent from consideration of the following detailed description when taken together with the accompanying drawings.

Figure 1:
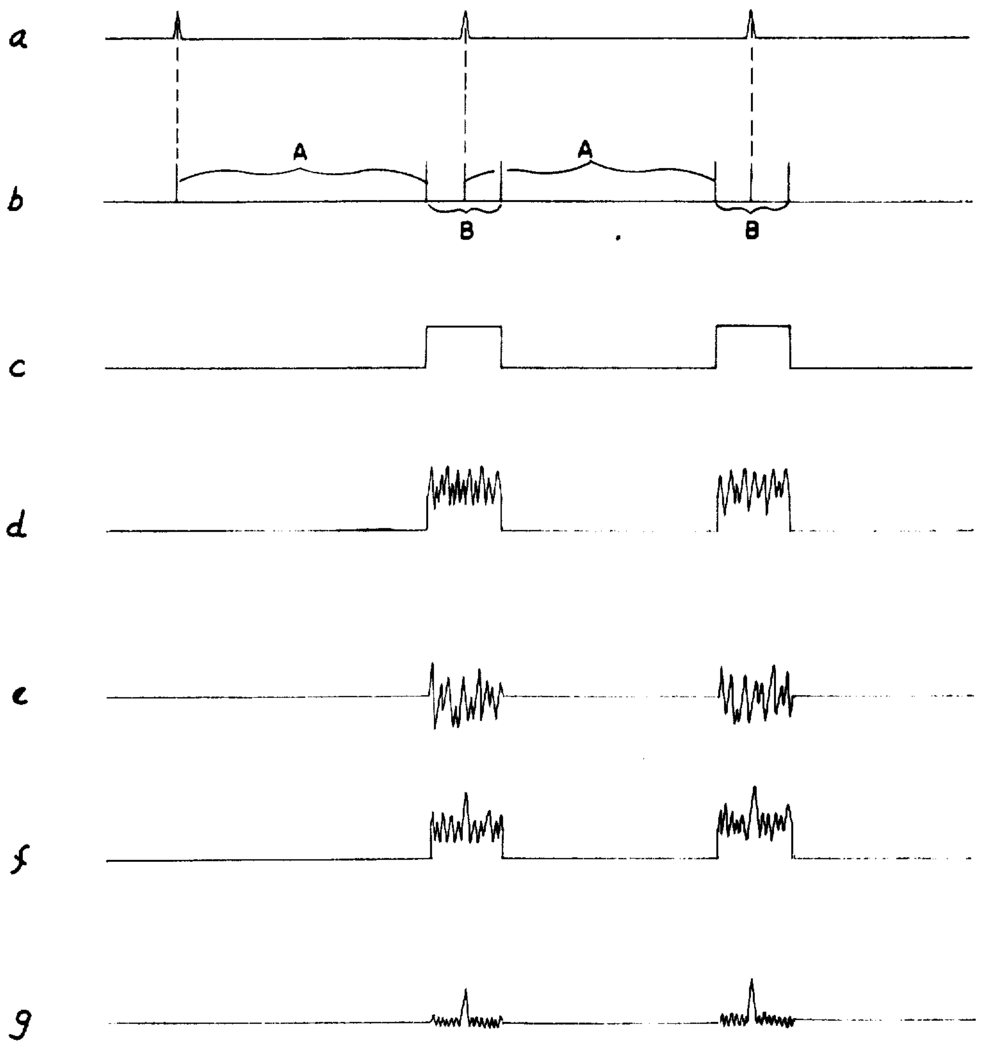
FIG. 1 shows the waveforms of various signals to which reference is made in describing the operation of the invention.

The operation of the preferred embodiment of this invention as a means of impairing the effectiveness of fire control radio echo location equipment can be summarized in connection with FIG. 1.

The invention receives the periodic pulses transmitted by the enemy echo location transmitter and shown by the detected envelope thereof in waveform *a*. In response to each received pulse, timing circuits in the invention initiate a delay period (shown as A on timing diagram *b*) and, at the end of the delay period establish an interference period (shown as B on timing diagram *b*). It is apparent that each received pulse controls the timing of the interfering pulse which is to cover the next succeeding received pulse.

Accordingly, the timing circuits in the invention yield a control signal shown as waveform *c*. This signal actuates a modulator which in turn actuates the circuits transmitting the high frequency interfering signal. The modulator applies noise modulated operating voltage to the transmitter; consequently, the modulator output appears as waveform *d*. The output of the system is shown symbolically as waveform *e* which represents the envelope of the output carrier frequency signal.

Some of the transmitted output of the system is unavoidably fed back into the receiver circuits, and, accordingly, the detected output of these receiver circuits would appear as waveform *f* if arrangements were not made to neutralize this signal which is fed back. It will be noted that the pulses received from the echo location transmitter are impaired by the interfering signal. The invention includes means of neutralizing the interfering signal in the receiver circuits, and the final detected and neutralized output of the receiver circuits appears as waveform *g*.

Figure 2:
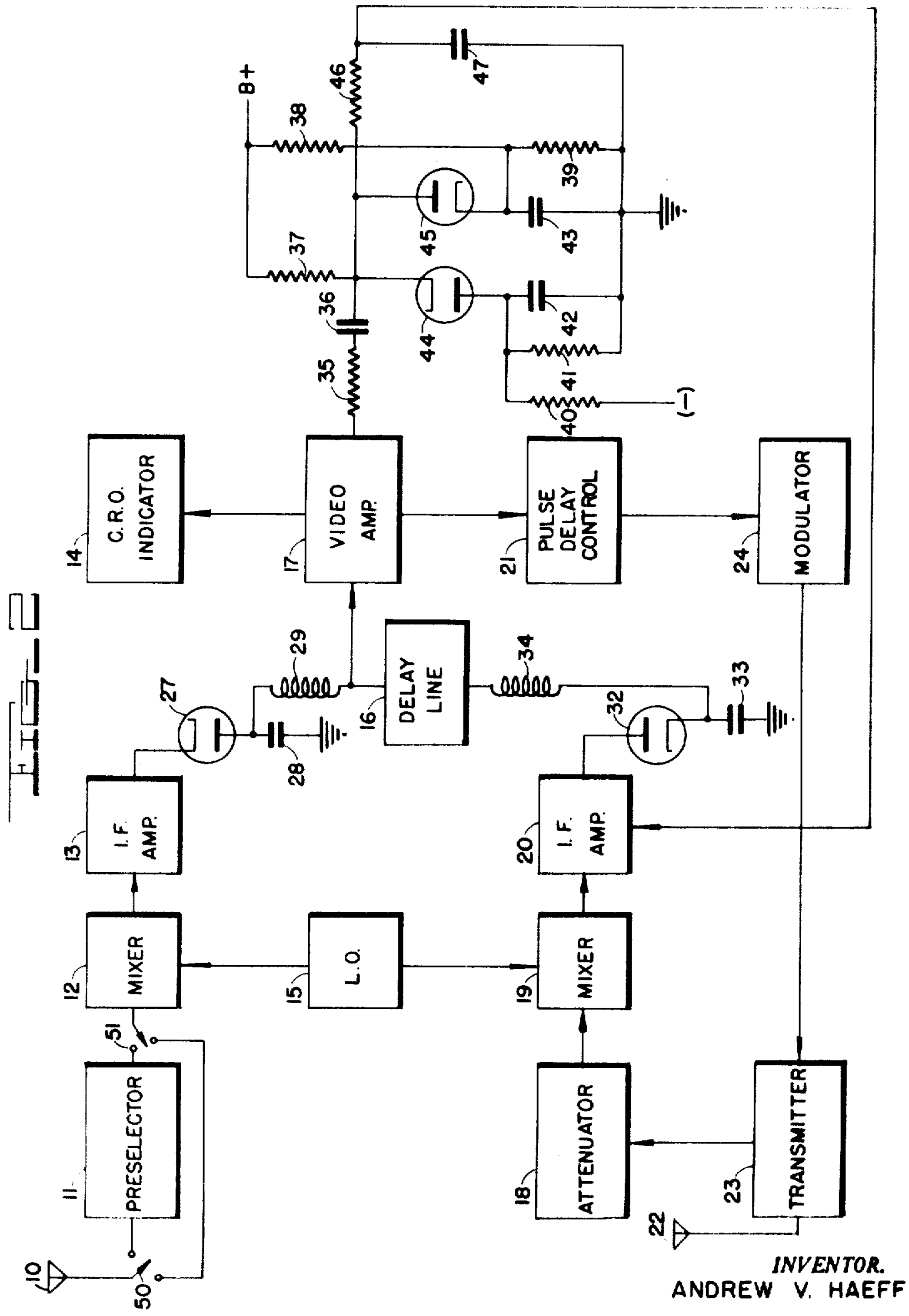
FIG. 2 shows, partly in schematic form, the interrelation of the various pertinent circuits of the preferred embodiment of the invention.

Specifically, and in accordance with FIG. 2, pulsed signals from the enemy radio echo location transmitter are received at antenna 10, passed through a preselector 11, converted to an intermediate frequency by beating with the output from local oscillator 15 in mixer 12, amplified in intermediate frequency amplifier section 13 and applied to detector tube 27.

In the receiver used with this embodiment of the invention, the local oscillator 15 is tuned first with the preselector 11 bypassed. After the local oscillator has been tuned for reception of the selected frequency, the preselector is inserted in the channel to eliminate the image frequency and to improve generally the selectivity of the receiver. Preselector 11 is of the resonant cavity type. Two double throw coaxial switches, shown symbolically as elements 50 and 51, permit switching the preselector into or out of the channel without disturbing the electrical properties of the coaxial system.

Detector tube 27 and its associated circuit elements capacitor 28 and radio frequency choke 29 form a conventional diode detector. The input signals are applied to the cathode of the tube; consequently, the demodulated signals are of negative polarity. The input circuit of diode 32, the function of which diode will be described hereinafter, loads the detector circuit when the latter is in operation.

The demodulated signal is amplified in the video amplifier 17 from which it is applied to the delay pulser circuits 21, the cathode-ray oscilloscope indicator 14, and the balance control circuits.

The functions of the cathode-ray oscilloscope indicator 14 are to determine when enemy signals are being received by the receiver, to analyze the characteristics of these signals, and to determine whether or not these signals are adequately covered by the interfering pulses which are being transmitted. Accordingly, the indicator is used first to adjust the equipment for use as an interference transmitter and second to monitor its operation as such.

The delay pulser circuits 21, which are described in greater detail in copending applications of Andrew V. Haeff and Franklin H. Harris: A Synchronizing System, Ser. No. 641,363, filed Jan. 15, 1946 now abandoned and Pulse Transmission System, Ser. No. 641,548 filed Jan. 16, 1946, now U.S. Pat. No. 2,561,363, receive the demodulated and amplified enemy signal pulses and for each received pulse apply, after a suitable delay, a pulse of selected length to the modulator 24. The delay must be such that each pulse applied to the modulator includes the next succeeding enemy pulse. The pulses applied to the modulator determine the duration as well as the timing of the interfering pulses to be transmitted; consequently, these pulses must have a duration sufficient to render enemy fire control radio echo location operations ineffective. It should be understood however, that although the devices of the copending applications are desirable for the purpose of providing automatic control of pulsing delay, they are by no means essential to the operation of the apparatus of the present invention. The delay pulse control 21 may be any form of variable delay pulse generator known to the art typical of which might be a multivibrator or a tapped delay line wherein the delay is readily adjustable. Observation of the signals on indicator 14 enables the operator to know when the delay setting is correct.

The modulator 24 in turn actuates the transmitter 23 with a pulse of suitable amplitude and the same duration as that received from the delay pulser 21.

The output from the transmitter 23 is radiated through a separate antenna 22. Antenna 10 and antenna 22 are positioned with respect to one another and shielded from one another so that there is a minimum of radiation coupling between them. However, a portion of the transmitted signal is received at antenna 10 and accordingly passed through the receiver circuits described above. As has been mentioned above, this portion of the transmitted signal which is fed back into the system through radiation coupling between the two antennas would prevent satisfactory monitoring of the enemy signals and would prevent the pulser circuits from operating as they are intended to operate. Consequently, the following means are provided to neutralize this signal in the receiver circuits.

A portion of the transmitter output is coupled directly to a balancing channel in the receiver comprising attenuator 18, mixer 19, intermediate frequency amplifier section 20, detector 32, and delay line 16. Attenuator 18 is adjusted so that the signals applied through the two channels will be of approximately equal amplitude when applied to the video amplifier 17. Mixer 19 and intermediate frequency amplifier section 20 performs the same functions in the balancing channel as the corresponding circuits 12, and 13 perform in the signal channel. Detector tube 32 and its associated circuit elements capacitor 33 and choke coil 34 form a conventional diode detector similar to the detector in the other channel except that the input signals are applied to the plate of tube 32 and accordingly the demodulated signals are of positive polarity. The input circuit of diode 27 loads detector 32 when the latter is in operation.

The path of the signal to be neutralized; i.e., the signal entering the receiver antenna from the transmitter antenna, is longer than that of the neutralizing signal; consequently, a conventional delay line 16 is inserted in the balancing channel in order that the two signals will coincide when applied to the video amplifier.

The gain of the intermediate frequency amplifier section 20 is controlled so as to make the neutralizing action effective by an automatic balance control circuit shown as diodes 44 and 45 and their associated circuit elements. In the output from video amplifier 17, the enemy signal and the interfering signal received through antenna 10 would appear as negative pulses and the interfering signal passed through the balancing channel would appear as a positive pulse. The two pulses representing the interfering signal tend to offset one another and a pulse reflecting their difference in amplitude will actually appear in the output. When this difference in amplitude becomes larger than selected values for the two polarities, the automatic balance control circuits operate to change the bias and the gain of intermediate frequency amplifier section 20 to reduce this difference. The pulse representing the enemy signal is too short in comparison to the duration of the interfering signal to have appreciable effect on the balance control circuits.

The output of the video amplifier 17 is applied to the cathode of diode 44 and to the plate of diode 45 through resistor 35 and capacitor 36. When the balancing channel is undercompensating for the interfering signal received through antenna 10, negative pulses will be applied to the cathode of diode 44. The plate of diode 44 is held at a suitable negative potential by the voltage divider comprising resistors 40 and 41, and by capacitor 42. If the negative pulses are of sufficient amplitude, diode 44 conducts and capacitor 36 becomes charged in such a way as to make more positive the bias applied to the control grids of intermediate frequency amplifier 20 section through the filter comprising resistor 46 and capacitor 47.

Similarly, when the balancing channel is overcompensating for the interfering signal received through antenna 10, positive pulses will be applied to the plate of diode 45. The cathode of diode 45 is maintained at a suitable positive potential by the voltage divider comprising resistors 38 and 39 and by capacitor 43. If the positive pulses are of sufficient amplitude, diode 45 conducts and capacitor 36 becomes charged in such a way as to make more negative the bias applied to the intermediate frequency amplifier section.

The plate of diode 45 and the cathode of diode 44 are connected to the power supply through a very large resistor 37. Consequently, the bias in the no signal condition is slightly more positive than the potential of the cathode of diode 45. Between pulses, capacitor 36 discharges toward this bias through resistor 37; however, the time constant of the discharging path is sufficiently large to insure a stable bias potential.

Figure 3:
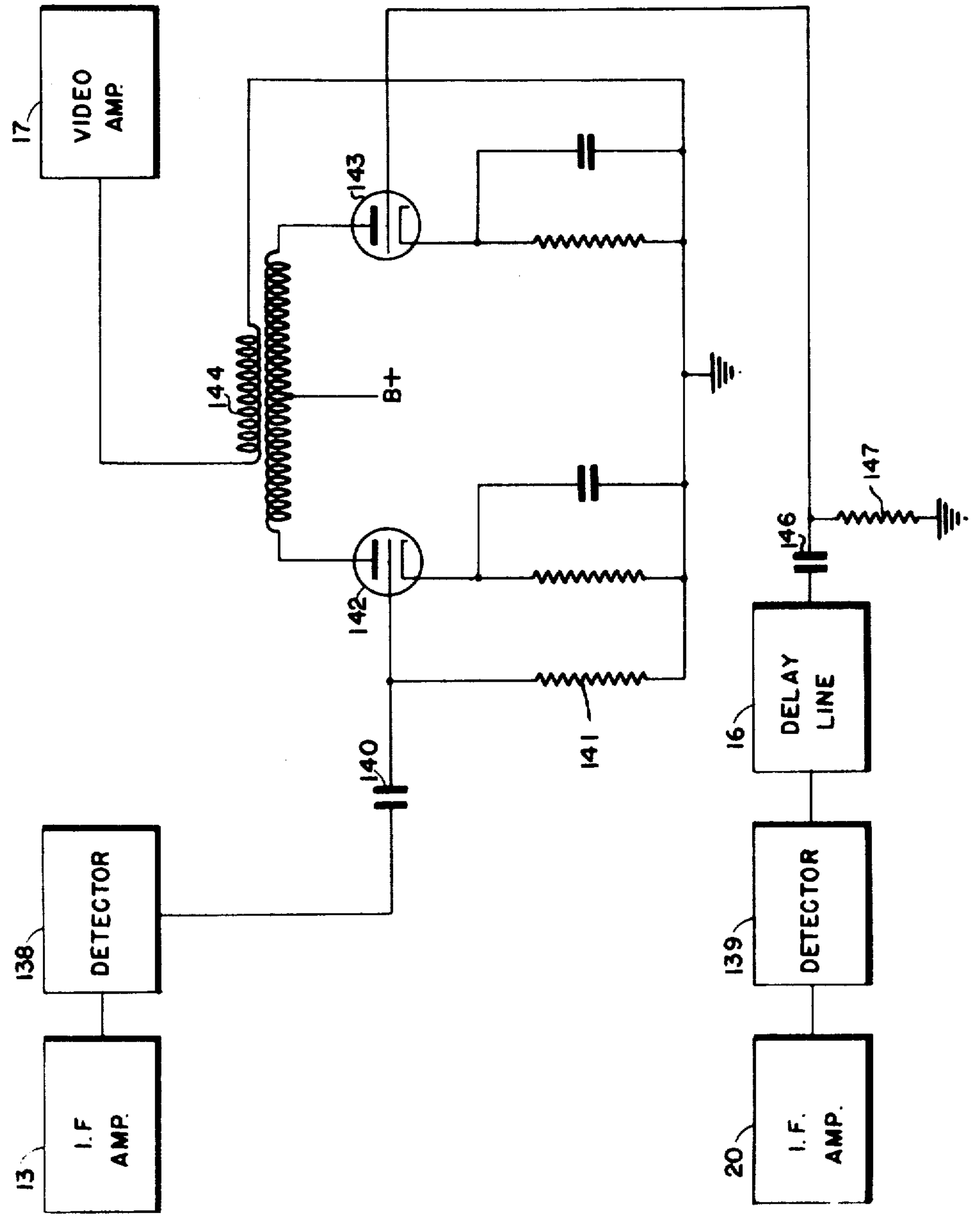
FIG. 3 shows, partly in schematic form, some of the pertinent circuits of a second embodiment of the invention.

FIG. 3 shows the circuits used to mix the outputs from the signal channel and the balance channel in a second embodiment of the invention. A differential amplifier comprising vacuum tubes 142 and 143 and their associated circuits receives the two outputs. The output of this differential amplifier is transformer coupled to the video amplifier.

The output of the signal channel detector 138 is applied to the control grid of tube 142 through the coupling network comprising capacitor 140 and resistor 141. The output of the balance channel detector 139 is passed through delay line 16 and applied to the grid of tube 143 through the coupling network comprising capacitor 146 and resistor 147. The plates of vacuum tubes 142 and 143 are connected to the terminals of the primary of transformer 144. The center tap of the primary of transformer 144 is connected to the positive side of the power supply. The secondary of transformer 144 is connected to the video amplifier 17. In this embodiment the outputs of detectors 138 and 139 are of the same polarity.

Although only certain and specific embodiments of the invention have been shown and described, I am fully aware of the many modifications possible thereof. Therefore, this invention is not to be limited except insofar as is necessitated by the spirit of the prior art and the scope of the claims.

The invention described herein may be manufactured and used by or for the Government of the United States of America for governmental purposed without the payment of any royalties thereon or therefor.

What is claimed is:

1. A method of impairing the effectiveness of radio echo location operations in which radio frequency impulses are transmitted to an obstacle and the reflections thereof received at the echo location station, which comprises the steps of initiating the transmission of an interfering signal before the receipt of each said radio frequency impulse, maintaining transmission of the interfering signal during receipt of that impulse, and terminating the transmission of the interfering signal after receipt of that impulse but before the receipt of a succeeding radio frequency impulse.

2. A means for impairing the effectiveness of radio echo location equipment, which recurrently transmits radio frequency impulses and receives their echoes from obstacles, which comprises; radio receiver means responsive to the radio echo location signals, delay pulser means actuated by the output of said receiver means to provide a pulse of selected duration a predetermined time after receipt of a radio echo location signal; and means transmitting interfering pulses actuated by the output from said delay pulser means; said delay pulser means being adjusted so that each interfering pulse includes in time the echo signal corresponding to the next succeeding signal received from said radio echo location equipment.

3. A means for impairing the effectiveness of radio echo location equipment, which recurrently transmits radio frequency impulses and receives their echoes from obstacles, which comprises; radio receiver means responsive to the radio echo location signals; delay pulser means actuated by the output of said receiver means to provide a pulse of selected duration a predetermined time after receipt of a radio echo location signal; means transmitting interfering pulses actuated by the output of said delay pulser means; said delay pulser means being adjusted so that each interfering pulse includes in time the echo signal corresponding to the next succeeding signal received from said radio echo location equipment, and means neutralizing that portion of the output from said transmitting means which is fed back into said radio receiver means through radiation leakage.

4. A means for impairing the effectiveness of radio echo location equipment, which recurrently transmits radio frequency impulses and receives their echoes from obstacles, which comprises; means transmitting pulsed interfering signals; a radio receiver containing two channels, the first of said channels receiving signals from said radio echo location equipment and said interfering signals, the second of said channels receiving said interfering signals only; means in said receiver for mixing the outputs of said two channels so as to neutralize said interfering signals; and to deliver the signals from the radio echo location equipment; and delay pulser means actuated by the output from said receiver to provide a pulse of selected duration a predetermined time after receipt of a radio echo location signal, said delay pulser means actuating said means transmitting interfering pulses.

5. A means for impairing the effectiveness of radio echo location equipment, which recurrently transmits radio frequency impulses and receives their echoes from obstacles, which comprises; means transmitting pulsed interfering signals; a radio receiver containing two channels, the first of said channels receiving signals from said radio echo location equipment and said interfering signals, the second of said channels receiving said interfering signals only; means in said receiver for mixing the outputs of said two channels so as to neutralize said interfering signals; and to deliver the signals from the radio echo location equipment; and delay pulser means actuated by the output from said receiver to provide a pulse of selected duration a predetermined time after receipt of a radio echo location signal, said delay pulser means actuating said means transmitting interfering pulses, said delay pulser means being adjusted so that each said interfering signal covers in time the echo signal corresponding to the next succeeding signal received from said radio echo location equipment.

6. The apparatus as defined in claim 5 including automatic control means coupled between the receiver mixing means and said second channel for automatically adjusting the gain of said second channel whenever the difference between the interference signals of said first and second channels exceeds a predetermined amount.

7. A means for impairing the effectiveness of radio echo location equipment, which recurrently transmits radio frequency impulses and receives their echoes from obstacles, which comprises; means transmitting pulsed interfering signals; a radio receiver containing two channels, the first of said channels receiving signals from said radio echo location equipment and said interfering signals, and the second of said channels receiving said interfering signals only, the output of one of said channels being of one polarity, the output of the other of said channels being of the opposite polarity; means within said receiver mixing the outputs of said two channels; means within said receiver controlling the gain of said second channel, said controlling means being responsive to the output of said receiver so that said interfering signals remain substantially neutralized; and delay pulser means actuated by the output from said receiver to provide a pulse of selected duration a predetermined time after receipt of a radio echo location signal, said delay pulser means actuating said means transmitting interfering pulses.

8. In apparatus which comprises a receiver which receives, amplifies, and demodulates radio signals and a transmitter which transmits other radio signals in response to said demodulated signals, a means for neutralizing said transmitted signals entering said receiver by radiation coupling, which comprises, amplifier means, attenuator means directly coupling a portion of the output of said transmitter to said amplifier means, separate demodulator means receiving the output of said amplifier means, means mixing the output of said separate demodulator means with said demodulated signals so as to neutralize that portion of said demodulated signals corresponding to said transmitted signals, and means responsive to the output of said mixing means for suitably controlling the gain of said amplifier means, so that the demodulated transmitted signals remain substantially neutralized.

9. In a radio echo jamming system, apparatus for minimizing at the jamming station the effect of an interference signal which is being transmitted simultaneously with the reception of a signal from a remote radio echo location system comprising, means for receiving the radio echo location signal and the interference signal appearing simultaneous therewith, the receiving means including demodulating means, separate channel means coupled directly to the interference signal transmitting means, said separate channel means including demodulating means, and means responsive to the output of said receiving means and said separate channel means for neutralizing the demodulated interference signal from said receiving means with the demodulated interference signal from said separate channel means and delivering substantially only the demodulated radio echo location signal.

10. The apparatus as defined in claim 9 including automatic control means coupled between the last named means and said separate channel means for automatically adjusting the gain of said separate channel means whenever the difference between the demodulated interference signals to be neutralized exceeds a predetermined amount.

* * * * *